B. F. SHELABARGER.
Harrow.
No. 5,687.  Patented Aug. 1, 1848.
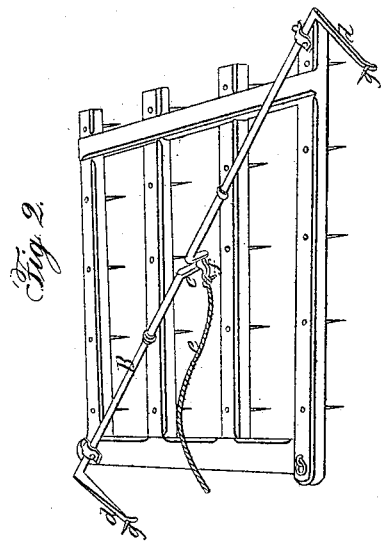
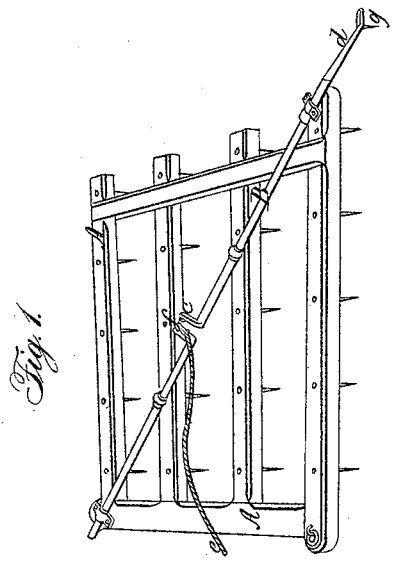

UNITED STATES PATENT OFFICE.

BENJ. F. SHELABARGER, OF MIFFLINTOWN, PENNSYLVANIA.

IMPROVEMENT IN HARROWS.

Specification forming part of Letters Patent No. 5,687, dated August 1, 1848.

*To all whom it may concern:*

Be it known that I, BENJAMIN F. SHELABARGER, of Mifflintown, in the county of Juniata and State of Pennsylvania, have invented and added a new and valuable Improvement to Harrows; and I do hereby declare the following to be a full, clear, and exact description thereof, reference being had to the accompanying drawings, making a part of this specification.

It is well known that harrows when used on most descriptions of soil soon become foul and clogged and require to be lifted up by the attendant to clear them.

The nature of my invention consists in the combination of a self-lifter to the harrow, composed of a shaft having right-angular lifting arms or levers at each end and a short crank at the center of the same, in such a manner that a boy seated on the horse attached to the harrow by drawing a cord connected to the central crank will revolve the shaft and throw the lifting-levers forward of the same. When the levers strike against the earth they lift the harrow as they are brought into a vertical position by the revolution of the shaft caused by the forward movement of the harrow.

In the accompanying drawings, Figures 1 and 2 are perspective views of a harrow with the lifter combined with the same represented in different positions in each figure.

A is the harrow, constructed in any well-known manner.

B is the shaft of the lifter, secured in suitable bearings in the same.

$d\ d$ are the lifting arms or levers at each end of the shaft, and $c$ the crank at the center of the same.

$e$ is the cord for operating the lifter, connected to the crank $c$ by means of the metallic loop $f$.

In Fig. 1 the lifting-arms $d\ d$ are represented as trailing behind in their usual position. In Fig. 2 the arms $d\ d$ are represented as having just been thrown forward into a position for lifting the harrow as it advances.

$g\ g$ are auxiliary teeth in the ends of the arms $d\ d$, which may or may not be inserted.

It will readily be perceived that the services of a man for lifting and attending to my improved harrow can be dispensed with, thereby producing a very considerable saving to the farmer.

What I claim as my invention, and desire to secure by Letters Patent, is—

The manner of lifting and cleaning the harrow of trash by means of the self-lifter, composed of the shaft B, the lifting arms or levers $d\ d$, and crank $c$, combined with the harrow, and operating substantially in the manner herein set forth, or in any other similar or analogous manner.

BENJAMIN F. SHELABARGER.

Witnesses:
A. H. McCLURE,
JOS. M. BELFORD.